3,333,100
COATING THICKNESS MEASURING APPARATUS WHEREIN A SCANNING ELECTRON BEAM PRODUCES CHARACTERISTIC X-RAYS DETECTED BY PLURAL DETECTORS
Frank F. Cilyo, La Grange, Ill., assignor to United States Steel Corporation, a corporation of Delaware
Filed July 6, 1964, Ser. No. 380,278
3 Claims. (Cl. 250—83.3)

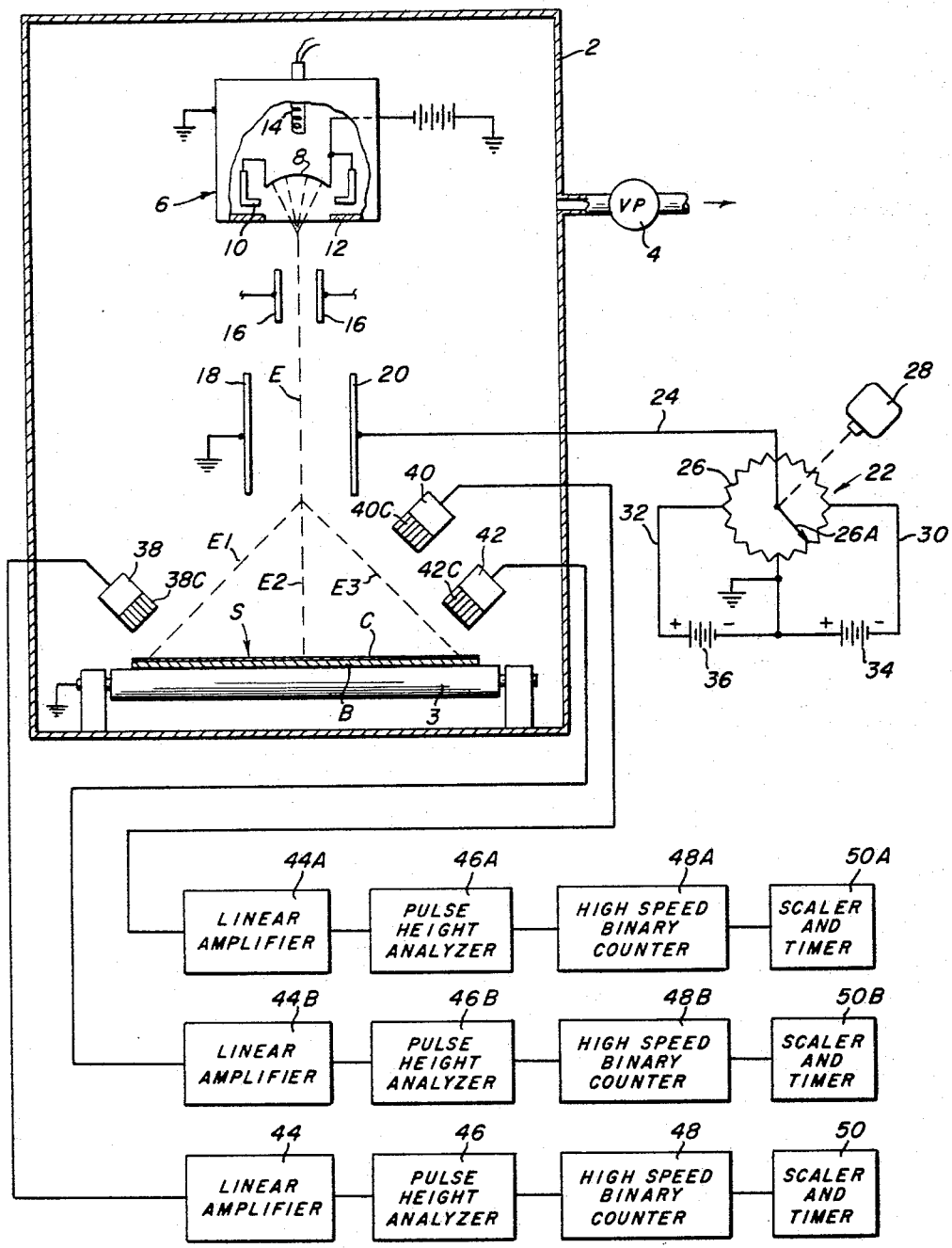

This invention relates to apparatus for measuring the thickness of a coating on a moving strip and more particularly to the measuring of a metal coating on a steel strip at a number of positions across the width thereof. The thickness of the deposited coating tends to vary across the width of the strip, particularly when vapor depositing a coating on a rapidly moving strip. Hence, it is desirable to continuously measure the coating thickness across the strip so that when the thickness varies the coating apparatus can be adjusted to produce a uniform coating. The present X-ray and electron beam types of coating thickness gauges either measure the thickness at a fixed position or mechanically traverse the width of the strip. Transverse movement of the mechanical traversing type is very slow as compared to the speed of the strip so that a true profile of coating thickness across the width of the strip cannot be obtained.

It is therefore an object of my invention to provide apparatus for measuring coating thickness profile across the width of a rapidly moving strip which is not dependent upon a mechanical traverse.

This and othe objects will be more apparent after referring to the following specification and attached drawings, in which:

The single figure is a schematic view of the apparatus of my invention.

Referring more particularly to the drawings, reference numeral 2 indicates a chamber through which strip S passes. In one particular embodiment the strip S includes a steel base B and an aluminum coating C. The strip S is grounded in any suitable manner as by means of a roll 3. A vacuum pump 4 is connected to the chamber 2 so that the chamber can be evacuated to a pressure not exceeding 100 microns of mercury. Suitable means, not shown, are provided for preventing loss of vacuum where the strip S passes into and out of the chamber 2. A beam of electrons E is generated within the chamber 2 by an electron gun 6 which is of conventional design. The electron gun 6 includes a hemispherical high temperature cathode 8, a focusing electrode 10 and an accelerating anode 12. The cathode 8 is heated indirectly by means of a filament 14. The beam of electrons emitted from the gun 6 passes between a pair of negatively charged parallel focusing plates 16 which serve to focus or shape the beam of electrons into a narrow beam. The beam E then passes between a pair of parallel beam deflector plates 18 and 20. Plate 18 is grounded and plate 20 is connected to a varying potential source 22 through lead 24. The source 22 includes a resistor 26 having a contact arm 26A which is moved continuously along the resistor by means of a motor 28. The arm 26A is connected to the lead 24. Conductors 30 and 32 are connected to opposite sides of the resistor 26 and to the negative terminal of a battery 34 and the positive terminal of a battery 36. The resistor 26 is connected to ground at a location midway between the connections of the conductors 30 and 32 to the resistor. The positive terminal of battery 34 and the negative terminal of battery 36 are connected to ground. Movement of the slider arm 26A along the resistor 26 changes the potential between the plates 18 and 20 from zero to a maximum negative potential, then back to zero potential, then to a maximum positive potential and then back to zero potential. This changing of the relative potential between the plates 18 and 20 causes the electron beam E to rapidly traverse the width of the moving strip S. Three of these positions are indicated in the drawing by reference characters E1, E2 and E3. A standard electronic sweep generator may be substituted for the motor driven potentiometer.

Three X-ray detectors 38, 40 and 42 are positioned within the chamber 2 as shown in order to detect characteristic X-rays from the strip at the positions excited by beams E1, E2 and E3, respectively. The X-ray detectors may be standard flow proportional counters having collimators 38C, 40C and 42C. The output of detector 38 is connected to a standard linear amplifier 44 which in turn is connected to a standard pulse height analyzer 46. The output of the analyzer 46 is connected to a high speed binary counter 48, the output of which is connected to a standard scaler and timer 50. In like manner the outputs of detectors 40 and 42 are connected to a similar system, the parts connected to detector 40 being indicated by reference characters 44A, 46A, 48A and 50A and the parts connected to detector 42 being indicated by reference characters 44B, 46B, 48B and 50B.

The amplifier 44, analyzer 46 and binary counter 48 may be separate standard components or may be contained in a single unit such as that designated TPA Unit 52332 in Norelco's X-ray Instrument Brochure, RC–212B 5M1159 published by the Philips Electronics and Pharmaceuticals Industries Corporation of Mt. Vernon, N.Y. The scaler and timer 50 may also be a conventional unit indicated as 12112 in the same brochure. The detectors 38, 40 and 42 may be of the type incorporated in the universal X-ray vacuum spectrograph 52360 also shown in this brochure.

The electron beam may excite the characteristic X-rays of either the coating or the base material. In the first case, conventional means may be employed to measure the characteristic radiation as a function of coating thickness. In the latter case, the characteristic radiation not absorbed by the coating is measured as a function of the absorption by the coating and thus an indication of the thickness of the coating. Both of these types of gauges are conventional and hence no further description thereof is necessary.

Assuming that a maximum thickness of 100 microinches of aluminum is to be measured on a steel strip the electron beam voltage may be between 10 and 20 kilovolts. By operating the gun at 10 kilovolts the electron beam striking the strip will excite aluminum coating to cause the emission of characteristic X-rays therefrom. The detector 38 will detect the characteristic X-rays from the left side of the strip S as shown in the drawing and the reading on the scaler and timer 50 will indicate the thickness of the coating. As arm 26A continues its movement the change in the electric field between plates 18 and 20 will deflect the beam E to the position E2 where the detector 40 will measure the characteristic X-ray so as to indicate the thickness of the coating on scaler 50A. Continued movement of the arm 26A will change the electric field between plates 18 and 20 so that the beam will assume the position E3 where the detector 42 will detect the characteristic X-ray and the scaler 50B will indicate the thickness of the strip coating at the right hand edge of the strip. Continued movement of the arm 26A will cause the electron beam to follow the path E2 and E1 in succession with the thickness being indicated on scaler and timers 50B and 50, respectively. This movement is then repeated.

Additional detectors and associated equipment may be added if it is desired to obtain readings at additional transverse locations of the strip. Also a changing magnetic field may be substituted for the electric field described in order to change the position of the electron beam and the term "field" is used in the claims to cover either of these types of field.

While one embodiment of my invention has been shown and described it will be apparent that other adaptations and modifications may be made without departing from the scope of the following claims.

I claim:
1. Apparatus for measuring the thickness of a coating on a longitudinally moving strip at a plurality of fixed positions across the width thereof which comprises a chamber through which the strip passes, means for producing a vacuum in said chamber, means in said chamber spaced from the coated side of said strip for producing a narrow beam of electrons, a pair of parallel beam deflector plates between said last named means and said strip, means for sequentially changing the polarity of one of said deflector plates with respect to the other deflector plate to cause the electron beam to traverse the width of the strip, a plurality of X-ray detectors positioned to detect characteristic X-rays sequentially from said strip at different transverse positions of the strip, and means connected to each of said detectors to measure the thickness of the coating at the respective transverse positions.

2. Apparatus for measuring the thickness of a coating on a longitudinally moving strip at a plurality of fixed positions across the width thereof which comprises a chamber through which the strip passes, means for producing a vacuum in said chamber, means in said chamber spaced from the coated side of said strip for producing a beam of electrons, a pair of negatively charged parallel focusing plates between said last named means and said strip, a pair of parallel beam deflector plates between said focusing plates and said strip, means for sequentially changing the polarity of one of said deflector plates with respect to the other deflector plate to cause the electron beam to traverse the width of the strip, a plurality of X-ray detectors positioned to detect characteristic X-rays sequentially from said strip at different transverse positions of the strip, and means connected to each of said detectors to measure the thickness of the coating at the respective transverse positions.

3. Apparatus for measuring the thickness of a coating on a longitudinally moving strip at a plurality of fixed positions across the width thereof which comprises a chamber through which the strip passes, means for producing a vacuum in said chamber, means in said chamber spaced from the coated side of said strip for producing a narrow beam of electrons, means providing a changing field through which said narrow beam passes to cause said beam to traverse the width of the strip, a plurality of X-ray detectors positioned to detect characteristic X-rays sequentially from said strip at different transverse positions of the strip, and means connected to each of said detectors to measure the thickness of the coating at the respective transverse positions.

References Cited
UNITED STATES PATENTS

| | | | |
|---|---|---|---|
| 2,837,656 | 6/1958 | Hendee et al. | 250—51.5 |
| 2,967,934 | 1/1961 | Martinelli | 250—83.3 |
| 3,103,584 | 9/1963 | Shapiro et al. | 250—49.5 |

FOREIGN PATENTS

| | | |
|---|---|---|
| 1,366,011 | 6/1964 | France. |

RALPH G. NILSON, *Primary Examiner.*
W. F. LINDQUIST, *Assistant Examiner.*